US011429579B2

(12) United States Patent
Bordawekar

(10) Patent No.: US 11,429,579 B2
(45) Date of Patent: Aug. 30, 2022

(54) BUILDING A WORD EMBEDDING MODEL TO CAPTURE RELATIONAL DATA SEMANTICS

(71) Applicant: International Business Machines Corporation, Armonk, NY (US)

(72) Inventor: Rajesh Bordawekar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 16/665,364

(22) Filed: Oct. 28, 2019

(65) Prior Publication Data

US 2021/0124724 A1    Apr. 29, 2021

(51) Int. Cl.
*G06F 7/00* (2006.01)
*G06F 16/22* (2019.01)
*G06F 16/28* (2019.01)
*G06F 16/242* (2019.01)

(52) U.S. Cl.
CPC ........ *G06F 16/2237* (2019.01); *G06F 16/221* (2019.01); *G06F 16/243* (2019.01); *G06F 16/2438* (2019.01); *G06F 16/284* (2019.01)

(58) Field of Classification Search
CPC ............... G06F 16/284; G06F 16/2452; G06F 16/3329; G06F 16/243; G06F 16/221; G06F 16/2438
USPC ........... 707/711, 769, 999.002, 723, 999.005
See application file for complete search history.

(56) References Cited

U.S. PATENT DOCUMENTS

| 6,363,373 | B1 * | 3/2002 | Steinkraus | ............ G06F 16/313 |
| 10,097,204 | B1 * | 10/2018 | Huang | ................ H03M 13/616 |
| 2015/0026153 | A1 * | 1/2015 | Gupta | ....................... G06N 5/04 |
| | | | | 707/711 |
| 2017/0109355 | A1 | 4/2017 | Li et al. | |
| 2017/0177712 | A1 * | 6/2017 | Kopru | ................. G06F 16/3337 |
| 2018/0268024 | A1 * | 9/2018 | Bandyopadhyay | ... G06F 16/284 |

FOREIGN PATENT DOCUMENTS

| CN | 109062939 A | 12/2018 |
| CN | 109347801 A | 2/2019 |

OTHER PUBLICATIONS

IBM, "Transformation and mapping of textual data to relational data source entities," IP.com Prior Ad Database, Technical Disclosure No. IPCOM000154480D, Jul. 2, 2007, pp. 1-10.

(Continued)

*Primary Examiner* — Md I Uddin
(74) *Attorney, Agent, or Firm* — Zilka-Kotab, P.C.

(57) ABSTRACT

A computer-implemented method according to one embodiment includes identifying a relational database; determining columns of interest within the relational database; creating an unordered group of string tokens for each row of the relational database, utilizing the determined columns of interest; assigning weights for one or more columns within the relational database to one or more string tokens within each unordered group of string tokens to create a plurality of weighted unordered groups of string tokens; and determining a meaning vector for an identifier of each row of the relational database, utilizing the plurality of weighted unordered groups of string tokens.

16 Claims, 5 Drawing Sheets

(56) References Cited

OTHER PUBLICATIONS

Hofford, G., "Structure Logic: A New Method that Enables Richer Meaning Representations," IP.com Prior Art Database, Technical Disclosure No. IPCOM000235703D, Mar. 21, 2014, 447 pages.
Ehrenreich, R., "System and Method for Automatically Generating Platform-Specific Database Code from Schema composed of Typed Tables and Formulas," IP.com Prior Ari Database, Technical Disclosure No. IPCOM000255833D, Oct. 16, 2018, pp. 1-43.
Bollegala et al., "Embedding Semantic Relations into Word Representations," Proceedings of the Twenty-Fourth International Joint Conference on Artificial Intelligence (IJCAI), 2015, pp. 1222-1228.
Kerem et al., "Semantic Structure and Interpretability of Word Embeddings," IEEE/ACM Transactions on Audio, Speech, and Language Processing, vol. 26, No. 10, Revised May 16, 2018, pp. 1-11, retrieved from https://arxiv.org/abs/1711.00331.
Fernandez et al., "Seeping Semantics: Linking Datasets using Word Embeddings for Data Discovery," IEEE 34th International Conference on Data Engineering (ICDE), Apr. 16-19, 2018, 12 pages, retrieved from https://ieeexplore.ieee.org/document/8509314.
CSRC, "Cloud Computing," Computer Security Resource Center, Oct. 2017, 3 pages, retrieved from https://csrc.nist.gov/projects/cloud-computing.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
Mikolov et al., "Distributed Representations of Words and Phrases and their Compositionality," Proceedings of the 26th International Conference on Neural Information Processing Systems (NIPS), vol. 2, Dec. 5-10, 2013, pp. 1-9, retrieved from https://dl.acm.org/citation.cfm?id=2999959.
Pennington et al., "GloVe: Global Vectors for Word Representation," Proceedings of the 2014 Conference on Empirical Methods in Natural Language Processing (EMNLP), Oct. 25-29, 2014, pp. 1532-1543.
Bordawekar et al., "Cognitive Database: A Step towards Endowing Relational Databases with Artificial Intelligence Capabilities," arXiv, Dec. 19, 2017, pp. 1-14, retrieved from https://arxiv.org/pdf/1712.07199.pdf.
Bordawekar et al., "Enabling Cognitive Intelligence Queries in Relational Databases using Low-dimensional Word Embeddings," arXiv, Mar. 23, 2016, pp. 1-12, retrieved from https://arxiv.org/pdf/1603.07185.pdf.
Bordawekar et al., "Using Word Embedding to Enable Semantic Queries in Relational Databases," Proceedings of 1st Workshop on Data Management for End-to-End Machine Learning (DEEM '17), May 14, 2017, 4 pages.
Bordawekar et al., "Exploiting Latent Information in Relational Databases via Word Embedding and Application to Degrees of Disclosure," Proceedings of 9th Biennial Conference on Innovation Data Systems Research (CIDR '19), Jan. 2019, pp. 1-6.
Neves et al., "Demonstrating Semantic SQL Queries over Relational Data using the AI-Powered Database," 1st International Workshop on Applied AI for Database Systems and Applications (AIDB '19), Aug. 26, 2019, pp. 1-12.

\* cited by examiner

BUILDING A WORD EMBEDDING MODEL TO CAPTURE RELATIONAL DATA SEMANTICS

BACKGROUND

The present invention relates to data analysis, and more particularly, this invention relates to performing database embedding to capture relational data semantics.

The application of word embedding models is a popular way to increase a performance of tasks such as natural language processing (NLP). For example, word embedding may map words and/or phrases from a vocabulary to vectors representing a meaning of the words/phrases, and such vectors are used during NLP tasks. It is therefore desirable to apply such embedding approaches to areas other than natural language models, such as relational databases, in order to gain more insight into the relationships of data within such databases. However, the structure of data found in relational databases is significantly different from the structure of data in natural language models.

BRIEF SUMMARY

A computer-implemented method according to one embodiment includes identifying a relational database; determining columns of interest within the relational database; creating an unordered group of string tokens for each row of the relational database, utilizing the determined columns of interest; assigning weights for one or more columns within the relational database to one or more string tokens within each unordered group of string tokens to create a plurality of weighted unordered groups of string tokens; and determining a meaning vector for an identifier of each row of the relational database, utilizing the plurality of weighted unordered groups of string tokens.

According to another embodiment, a computer program product for building a word embedding model to capture relational data semantics includes a computer readable storage medium having program instructions embodied therewith, where the computer readable storage medium is not a transitory signal per se, and where the program instructions are executable by a processor to cause the processor to perform a method including identifying, by the processor, a relational database; determining, by the processor, columns of interest within the relational database; creating, by the processor, an unordered group of string tokens for each row of the relational database, utilizing the determined columns of interest; assigning, by the processor, weights for one or more columns within the relational database to one or more string tokens within each unordered group of string tokens to create a plurality of weighted unordered groups of string tokens; and determining, by the processor, a meaning vector for an identifier of each row of the relational database, utilizing the plurality of weighted unordered groups of string tokens.

According to another embodiment, a system includes a processor; and logic integrated with the processor, executable by the processor, or integrated with and executable by the processor, where the logic is configured to identify a relational database; determine columns of interest within the relational database; create an unordered group of string tokens for each row of the relational database, utilizing the determined columns of interest; assign weights for one or more columns within the relational database to one or more string tokens within each unordered group of string tokens to create a plurality of weighted unordered groups of string tokens; and determine a meaning vector for an identifier of each row of the relational database, utilizing the plurality of weighted unordered groups of string tokens.

Other aspects and embodiments of the present invention will become apparent from the following detailed description, which, when taken in conjunction with the drawings, illustrate by way of example the principles of the invention.

DETAILED DESCRIPTION

Figure 1:
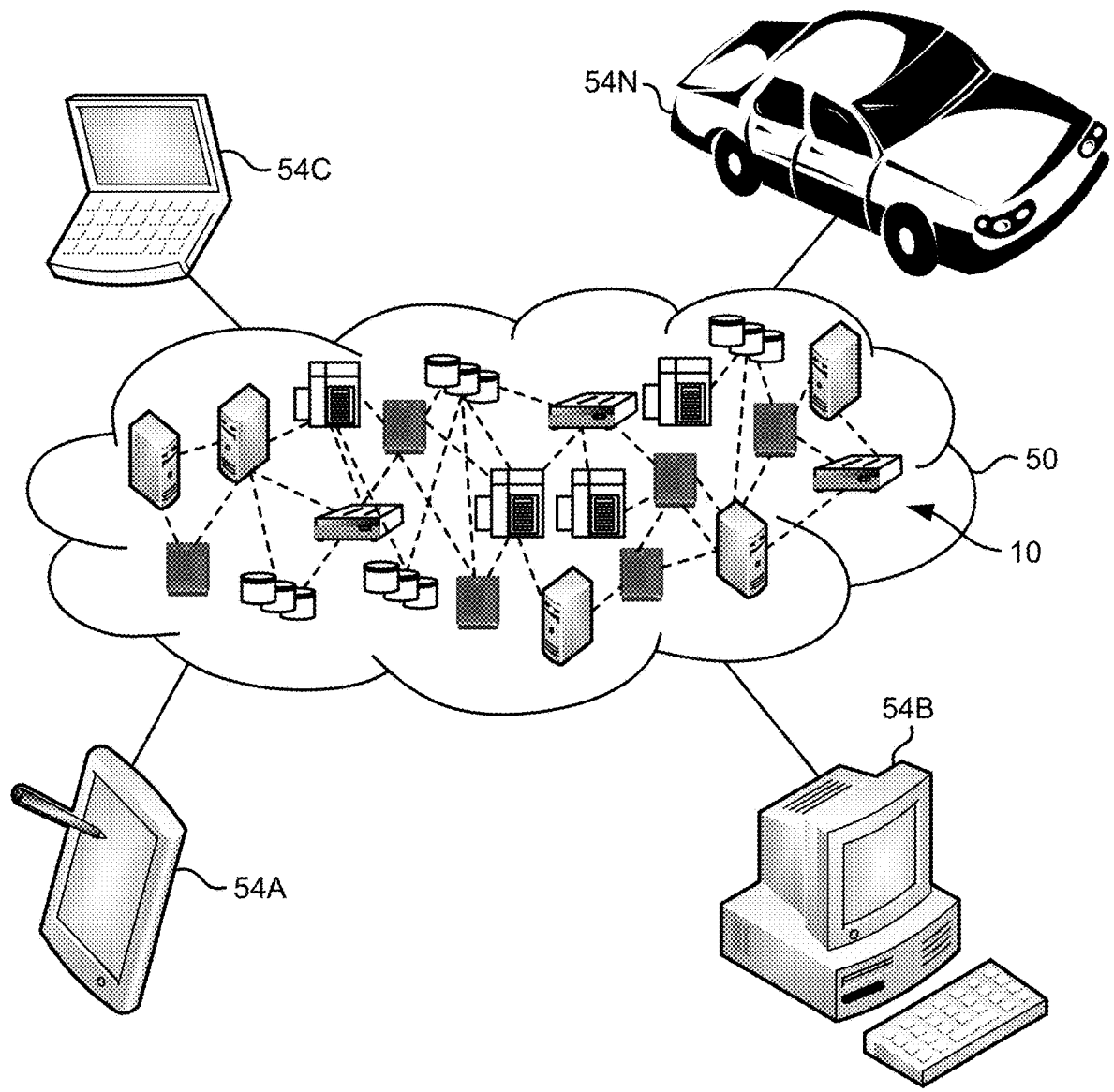
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of building a word embedding model to capture relational data semantics.

In one general embodiment, a computer-implemented method includes identifying a relational database; determining columns of interest within the relational database; creating an unordered group of string tokens for each row of the relational database, utilizing the determined columns of interest; assigning weights for one or more columns within the relational database to one or more string tokens within each unordered group of string tokens to create a plurality of weighted unordered groups of string tokens; and determining a meaning vector for an identifier of each row of the relational database, utilizing the plurality of weighted unordered groups of string tokens.

In another general embodiment, a computer program product for building a word embedding model to capture relational data semantics includes a computer readable storage medium having program instructions embodied therewith, where the computer readable storage medium is not a transitory signal per se, and where the program instructions are executable by a processor to cause the processor to perform a method including identifying, by the processor, a relational database; determining, by the processor, columns of interest within the relational database; creating, by the processor, an unordered group of string tokens for each row of the relational database, utilizing the determined columns of interest; assigning, by the processor, weights for one or more columns within the relational database to one or more string tokens within each unordered group of string tokens to create a plurality of weighted unordered groups of string tokens; and determining, by the processor, a meaning vector for an identifier of each row of the relational database, utilizing the plurality of weighted unordered groups of string tokens.

In another general embodiment, a system includes a processor and logic integrated with the processor, executable by the processor, or integrated with and executable by the processor, where the logic is configured to identify a relational database; determine columns of interest within the relational database; create an unordered group of string tokens for each row of the relational database, utilizing the determined columns of interest; assign weights for one or more columns within the relational database to one or more string tokens within each unordered group of string tokens to create a plurality of weighted unordered groups of string tokens; and determine a meaning vector for an identifier of each row of the relational database, utilizing the plurality of weighted unordered groups of string tokens.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
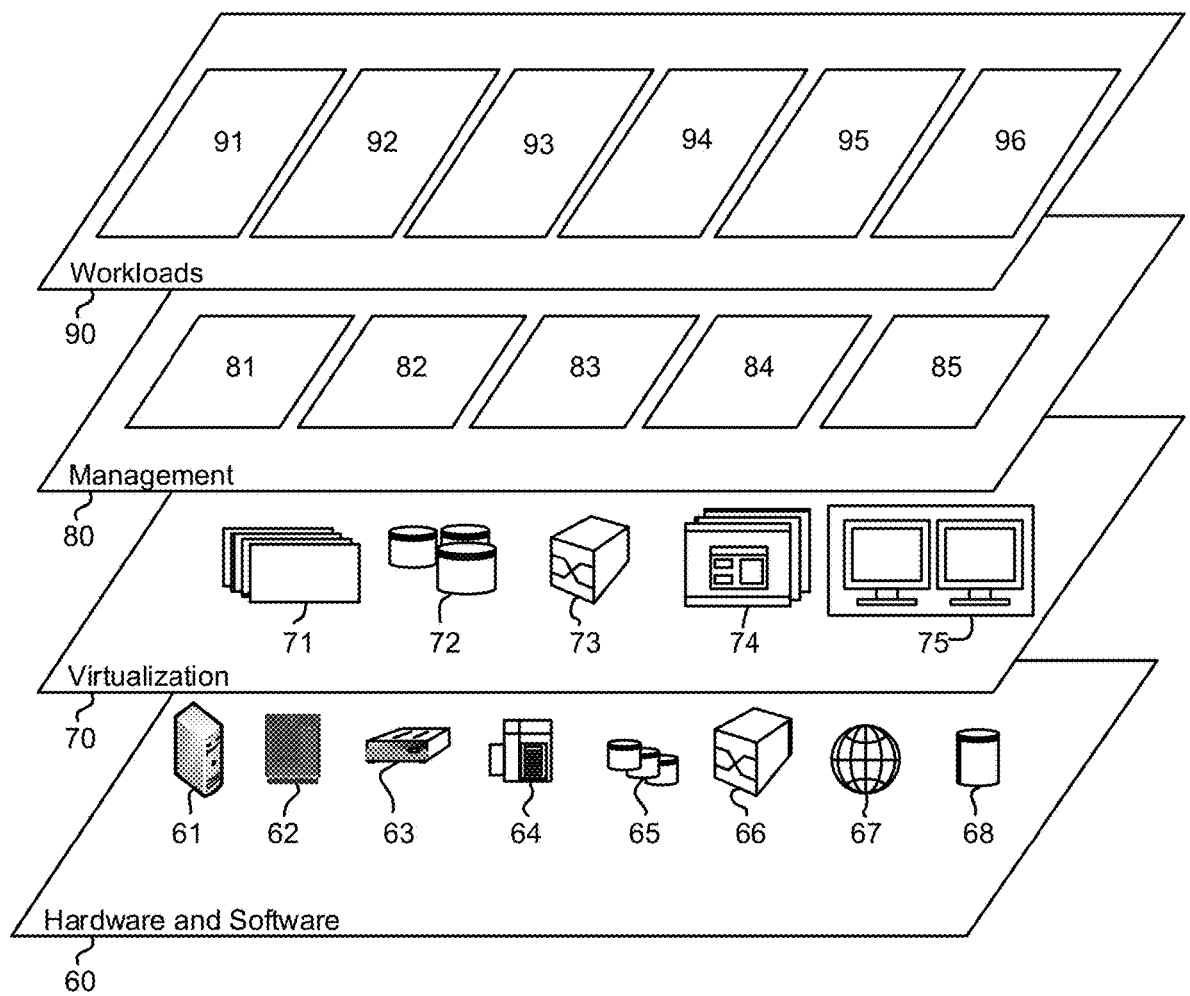
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining relational data semantics %.

Figure 3:
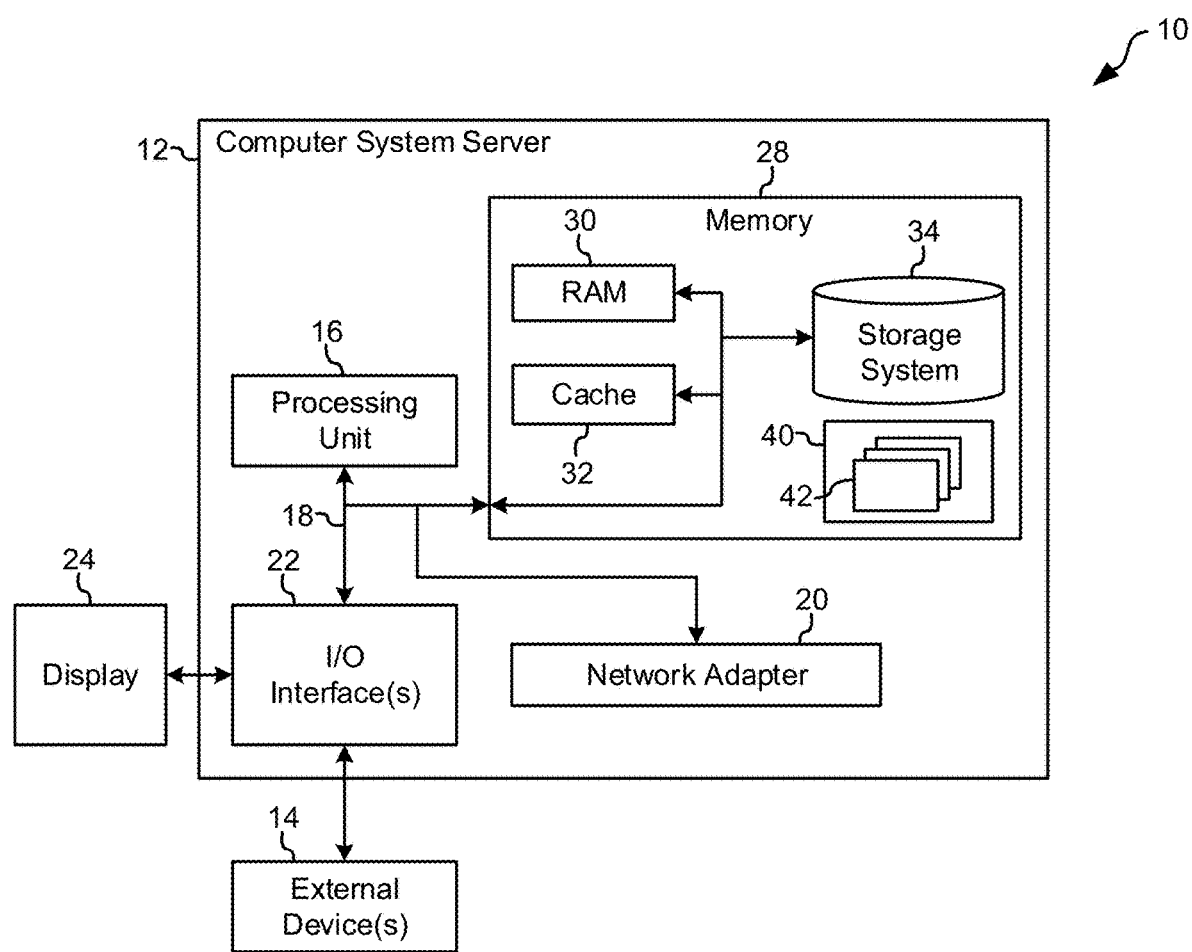
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
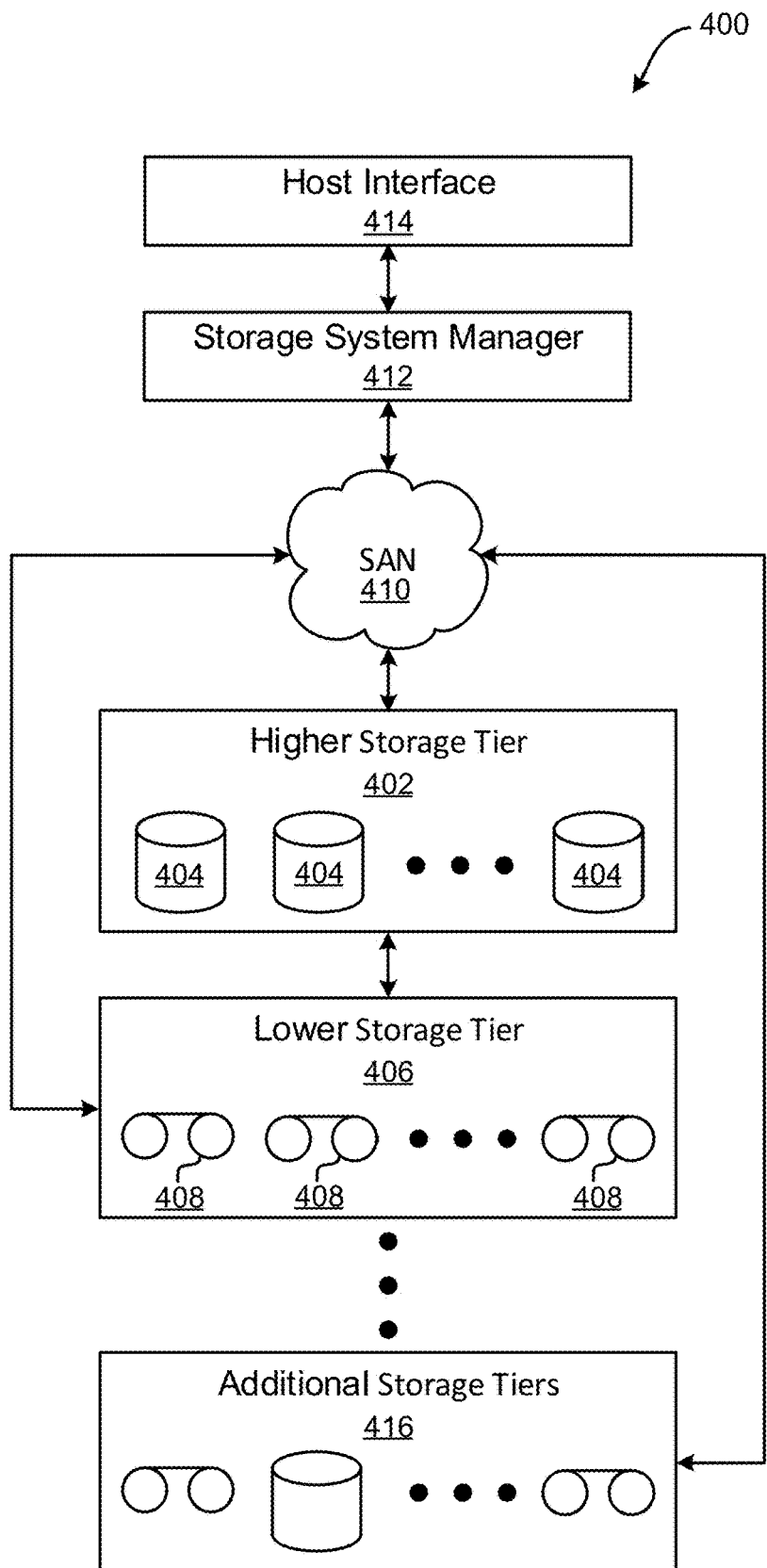
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
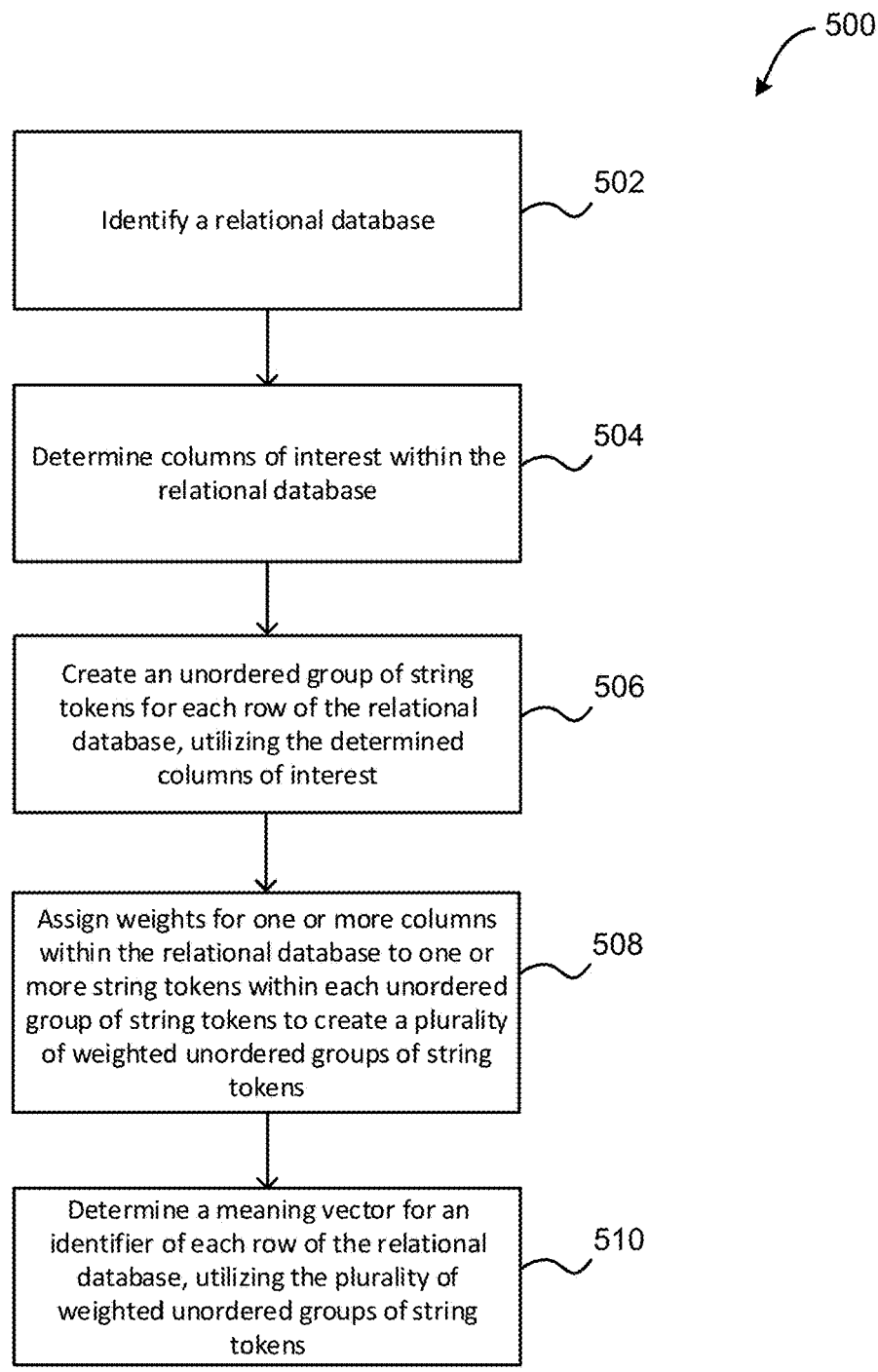
FIG. 5 illustrates a flowchart of a method for building a word embedding model to capture relational data semantics, in accordance with one embodiment of the present invention.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a relational database is identified. In one embodiment, a relational database may include a database that is organized to account for relationships between data stored within the database. In another embodiment, the relational database may be identified in response to a request to perform database embedding on the relational database. In yet another embodiment, the relational database may be received with the request to perform the database embedding.

Additionally, method 500 may proceed with operation 504, where columns of interest are determined within the relational database. In one embodiment, the relational database may include a plurality of rows and a plurality of columns. In another embodiment, an indication may be made within the relational database as to which columns within the relational database are to be included and/or excluded during the creation of the unordered group of string tokens.

Further, in one embodiment, one or more weights may be pre-assigned to one or more of the columns of the relational database. For example, each of the columns of the relational database may have an associated weight (e.g., an integer from one to ten, a "high," "medium," or "low" weight, etc.). In another embodiment, one or more columns of interest may include one or more encrypted columns. For example, the one or more encrypted columns may include columns within the relational database that include encrypted data.

Further still, method 500 may proceed with operation 506, where an unordered group of string tokens is created for each row of the relational database, utilizing the determined columns of interest. In one embodiment, the unordered group of string tokens may be created for each row of the relational database utilizing a textification process. In another embodiment, the textification process may convert all data types within the relational database into string tokens (e.g., strings, etc.).

For example, an entry within the relational database may include numeric data, calendar data (e.g., a date/time), etc. In another example, this data may be converted into a string format to create a string token for the entry.

Also, in one embodiment, for each row within the relational database, each entry within the row may be converted into a string token. In another embodiment, only columns of interest may be converted during the textification process. For example, for each row within the relational database, only entries within the row that are located within columns determined to be of interest may be converted into a string token.

In addition, in one embodiment, the string tokens created for an entire row of the relational database may comprise an unordered group of string tokens representing that row. For example, the unordered group of string tokens may include a bag of string tokens that do not have a predetermined and/or significant order. In another embodiment, during the textification process, a unique row identifier may be determined that captures a meaning of an entire row within the relational database.

For example, the unique row identifier may be the first entry within the row. In another example, the unique row identifier for a row may be added as metadata to the unordered group of string tokens for that row (e.g., to act as an identifier for the unordered group of string tokens, etc.).

Furthermore, in one embodiment, during the textification process, null values may be identified within a row of the relational database. For example, the null values may be removed from the unordered group of string tokens created for the associated row. In another embodiment, during the textification process, a primary key may be determined for each row within the relational database.

For example, it may be determined whether the primary key is unique for each of the plurality of rows within the relational database. For instance, it may be determined whether the primary key is unique by referencing a preexisting schema for the relational database. In another example, in response to determining that the primary key is unique for each of the plurality of rows within the relational database, the primary key for a row may be added as metadata to the unordered group of string tokens for that row (e.g., to act as an identifier for the unordered group of string tokens, etc.). In yet another example, the primary key may be used instead of (or in addition to) a unique row identifier for the row.

Further still, in one embodiment, during the textification process, for each row within the relational database, a column name may be determined for each entry within the row. For example, for each entry within the row, the column name for that entry may be prepended to the string token created for the entry. In another embodiment, the unordered group of string tokens may be created for each row of the relational database according to a relational data model. For example, the relational data model may indicate actions to be performed during the textification process.

Also, method 500 may proceed with operation 508, where weights for one or more columns within the relational database are assigned to one or more string tokens within each unordered group of string tokens to create a plurality of weighted unordered groups of string tokens. In one embodiment, the weights may include weights that are pre-assigned to one or more of the columns of the relational database.

Additionally, in one embodiment, a weight may be determined for each row within the relational database. In another embodiment, for each entry within the row, the determined weight for the row may be added the string token created for the entry (e.g., as metadata, etc.). In this way, an amount of influence that each of the string tokens has within the unordered group of string tokens for each row may be adjusted utilizing weights. In yet another embodiment, the weights may be assigned according to a relational data model.

Further, method 500 may proceed with operation 510, where a meaning vector is determined for an identifier of each row of the relational database, utilizing the plurality of weighted unordered groups of string tokens. In one embodiment, all of the weighted unordered group of string tokens may be input into a machine learning environment.

Further still, in one embodiment, the machine learning environment may apply one or more embedding techniques to all of the weighted unordered group of string tokens to determine meaning vectors for identifiers of each row of the relational database. For example, a first string token having a higher weight than a second string token may be assigned a greater contribution than the second string token within an associated unordered group of string tokens during the one or more embedding techniques.

Also, in one embodiment, the meaning vector for each identifier may include a real number vector representative of a meaning of the identifier within a context of the relational database. In another embodiment, the machine learning environment may be modified according to a relational data model. In yet another embodiment, the machine learning environment may be modified to account for unordered string tokens within each plurality of string tokens.

For example, the embedding techniques may include a round-robin identification/analysis for each unordered group of string tokens. In another example, for an unordered group of string tokens, a neighbor of a string token from a last column in a relational database table may be a string token from a first column of the relational database table.

In addition, in one embodiment, the machine learning environment may be modified to apply one or more embedding techniques to all of the weighted unordered group of string tokens to determine a meaning vector for a unique row identifier or primary key for each row of the relational database. In another embodiment, the machine learning environment may be modified to apply one or more embedding techniques to all of the weighted unordered group of string tokens to determine a meaning vector for each column of the relational database.

In another embodiment, the machine learning environment may be modified to account for null values within the weighted unordered group of string tokens while applying one or more embedding techniques. In this way, the relational data model may influence both the creation and modification of the unordered group of string tokens, as well as the way in which the machine learning environment processes these string tokens in order to determine resulting vectors for each entity within the table.

In this way, relationships between entities within the relational database (e.g., identifiers of each row of the relational database) may be determined. This may improve an understanding of existing relationships between data within a relational database. This may in turn improve a performance of queries to the database (e.g., structured query language (SQL) queries, etc.). For example, in response to receiving a query for the relational database, the meaning vectors for identifiers of each row of the relational database may be used to respond to the query.

Furthermore, more complex queries (e.g., semantic matching, inductive reasoning queries such as analogies or semantic clustering, and predictive queries using entities not present in a database, etc.) may be enabled within the relational database, utilizing the meaning vectors. This may decrease an amount of computing resources necessary to obtain complex relationship information for the relational database, and may therefore improve a performance of a computing device providing such information.

Building a Word Embedding Model to Capture Relational Data Semantics

Word embedding models are becoming pervasive and use of pre-trained model is increasing. Existing approaches are designed for modeling text data that assumes certain natural language models (e.g., English, etc.). For example, a strength of relationships between words goes down as the distance increases.

Word embedding is useful for building models from non-language-based datasets (e.g., relational databases). For example, a row becomes an English-like sentence, with relational entities mapped to their text versions. However, traditional word embedding models cannot capture underlying semantics.

In one embodiment, a word embedding model may capture relationships between entities using a relational data model. The model may account for primary keys, unordered typed words, NULL values, and user-specified views/weights, and may process data in a round-robin context.

This implementation may build both per-entity semantic vectors and row vectors that capture meanings of the entire relational row.

Table 1 illustrates exemplary entries in a relational database, according to one embodiment.

TABLE 1

| custID | Date | Merchant | State | Category | Items | Amount |
|---|---|---|---|---|---|---|
| custA | 9/16 | Merch1 | NY | Fresh Produce | Bananas, Apples | 200 |
| custD | 9/16 | Merch2 | NY | Stationery | Crayons, Folders | 60 |
| custC | 10/16 | Merch3 | CT | Fresh Produce | Bananas, Oranges | 80 |

The second row of the above table is as follows:
custD 9/16 Merch2 NY Stationery Crayons Folders 60

After performing textification, column names for entries may be prepended to the string tokens created for the entry to create an unordered group of string tokens for the row, and a unique row identifier may be prepended to the unordered group of string tokens, as follows:
Txn1 custD Date_9/16 Merchant Merch2 State_NY Category Stationery Items Crayons Folders Amount_60

In one embodiment, the unordered group of string tokens may not be a natural language sentence, as it does not follow any language model. In another embodiment, word embedding model training may incorporate constraints from the relational data model, such that different views generate different sentences.

Additionally, as shown above, each string token may have a type, defined by the relational schema (e.g., NY is of type "State," etc.). In one embodiment, an order of the string tokens in the generated unordered group of string tokens is immaterial. For example, each string token may be equally related to the other string tokens. In another embodiment, column-attribute specific weighting may be implemented.

Further, a round-robin context may be implemented. For example, the last string token, Amount_60 may have the unique row identifier Txn1 and the string token Folders as neighbors. In another embodiment, any NULL values within the database entries may be removed during textification, such that they are not located in the resulting unordered group of string tokens.

Further still, in one embodiment, the primary key token may be considered a neighbor of every other string token within the unordered group of string tokens. In this way, a meaning vector of the primary key may capture the meaning of an entire row. In another embodiment, a meaning of other string tokens may be the collective contributions of its neighbors.

In one embodiment, a word embedding model may be created from a database table. For example, a text version of the table may be created by mapping relational entities into equivalent strings, capturing their schema types, and creating a sentence from the rows based on the relational view being used.

In another embodiment, the sentence may be viewed as an unordered bag of words. In yet another embodiment, a primary key entity may be treated as a neighbor of every other entity in the sentence. In still another embodiment, a round-robin context may be used, and an impact of NULL values on the meaning of non-NULL entities may be prevented by ignoring such values. In another embodiment, a relative importance of entities on the overall meaning of a row may be specified, based on types.

Relational Database Model Training

Traditional word embedding approaches build vector embedding models from natural language text corpus using appropriate language models (e.g., for English, etc.). As these approaches fail to address various subtleties with the relational data model (e.g., supporting primary keys, different data types, or NULL values), an embedding approach for relational tables, db2Vec, is implemented. db2Vec operates on a text corpus generated by one or more relational tables.

In one exemplary scenario, a text token in a training set can represent either text, numeric, or image data. Thus, the model builds a joint latent representation that integrates information across different modalities using untyped uniform feature (or meaning) vectors.

The db2Vec implementation has the following exemplary characteristics:

- A sentence generated from a relational row is generally not in any natural language such as English. In one embodiment, every token in a sentence has equal influence on all other tokens in that sentence, irrespective of their positions; i.e., a sentence generated from a relational table is viewed as a bag of words, rather than an ordered sequence.
- Unlike words in a natural language text, entities derived from relational tables are typed (type defined by the corresponding column attribute). db2Vec captures the type information for building the meaning vectors. For example, if an entity appears in two different relational columns, db2Vec, treats the two instances as separate entities and builds two different meaning vectors.
- For traditional natural language use cases, word embedding models generate limited-sized vocabularies (often defined by the language model). In the case of a relational database, since the string entities are generated from source values of different types (e.g., unique string identifiers representing individual table rows), the vocabulary size can be very large.
- For relational data, special consideration is provided for primary keys. Traditional word embedding approaches discard less frequent words from computations. In the current implementation, by default, every token, irrespective of its frequency, may be assigned a vector. For a unique primary key (with a singular occurrence), its meaning vector represents the meaning of the entire row.
- In some cases, a model may be desired in which values of particular columns are given higher weightage for their contributions towards meanings of neighborhood words. This enables users to specify different weight ranges or importance (e.g., high, medium, or low) for different columns during model training.
- The db2Vec training algorithm provides special treatment for the entities corresponding to the SQL NULL (or equivalent) values. The NULL values are processed such that they do not contribute to the meanings of neighboring non-null entities, thereby eliminating false similarities.
- The db2Vec implementation is designed to enable incremental training, i.e. the training system takes as input a pre-trained model and a new set of generated sentences, and returns an updated model. This capability is critical as a database can be updated regularly and one cannot rebuild the model from scratch every time. The pre-trained model can be built from the database being queried, or from an external source such as text corpus, graph, or a database table.
- db2Vec supports building vector embedding models from multiple inter-related database tables linked via primary key-foreign key relationships. Forming a training corpus from multiple tables is non-trivial, and db2Vec supports different implementation options such as integrating multiple models built from different tables, building models from fewer un-normalized tables, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
identifying a relational database;
determining columns of interest within the relational database;
creating an unordered group of string tokens for each row of the relational database, utilizing the determined columns of interest;
identifying pre-assigned weights for one or more columns within the relational database;
adding the pre-assigned weights for the one or more columns to one or more string tokens within each unordered group of string tokens to create a plurality of weighted unordered groups of string tokens; and
determining a meaning vector for an identifier of each row of the relational database by applying, by a machine learning environment, one or more embedding techniques to the plurality of weighted unordered groups of string tokens;
receiving a query for the relational database; and
using the meaning vector for the identifier of each row of the relational database to respond to the query.

2. The computer-implemented method of claim 1, wherein an indication is made within the relational database as to which columns within the relational database are to be included during the creation of the unordered groups of string tokens.

3. The computer-implemented method of claim 1, wherein an unordered group of string tokens is created for each row of the relational database utilizing a textification process.

4. The computer-implemented method of claim 1, wherein a textification process converts all data types within the relational database into string tokens.

5. The computer-implemented method of claim 1, wherein for each row within the relational database, each entry within the row is converted into a string token.

6. The computer-implemented method of claim 1, wherein for each row within the relational database, only entries within the row that are located within columns determined to be of interest are converted into a string token.

7. The computer-implemented method of claim 1, wherein the string tokens created for an entire row of the relational database comprise an unordered group of string tokens representing that row.

8. The computer-implemented method of claim 1, wherein during a textification process, a unique row identifier is determined that captures a meaning of an entire row within the relational database.

9. The computer-implemented method of claim 1, wherein during a textification process, null values are identified within a row of the relational database, and the null values are removed from the unordered group of string tokens created for the row.

10. The computer-implemented method of claim 1, wherein during a textification process, a primary key is determined for each row within the relational database, and in response to determining that the primary key is unique for each of a plurality of rows within the relational database, the primary key for a row is added as metadata to an unordered group of string tokens for that row.

11. The computer-implemented method of claim 1, wherein during a textification process, for each row within the relational database, a column name is determined for each entry within the row, and the column name for that entry is prepended to a string token created for the entry.

12. The computer-implemented method of claim 1, wherein the machine learning environment is modified:
- to account for unordered string tokens within each plurality of string tokens by including a round-robin identification for each weighted unordered group of string tokens, where for each weighted unordered group of string tokens, a neighbor of a string token from a last column in a relational database table is a string token from a first column of the relational database table,
- to account for null values within the weighted unordered group of string tokens while applying one or more embedding techniques.

13. The computer-implemented method of claim 1,
wherein the meaning vector for the identifier of each row of the relational database includes a real number vector representative of a meaning of the identifier within a context of the relational database;
wherein one or more embedding techniques are applied by a machine learning environment to all of the weighted unordered group of string tokens to determine the meaning vector for the identifier of each row of the relational database.

14. The computer-implemented method of claim 1, wherein:
a first string token having a higher weight than a second string token is assigned a greater contribution than the second string token within an associated weighted unordered group of string tokens during the one or more embedding techniques, and
the meaning vector for the identifier of each row of the relational database includes a real number vector representative of a meaning of the identifier within a context of the relational database.

15. A computer program product comprising one or more computer readable storage media, and program instructions collectively stored on the one or more computer readable storage media, the program instructions comprising instructions configured to cause one or more processors to perform a method comprising:
identifying, by the one or more processors, a relational database;
determining, by the one or more processors, columns of interest within the relational database;
creating, by the one or more processors, an unordered group of string tokens for each row of the relational database, utilizing the determined columns of interest;
identifying, by the one or more processors, pre-assigned weights for one or more columns within the relational database;
adding, by the one or more processors, the pre-assigned weights for the one or more columns to one or more string tokens within each unordered group of string tokens to create a plurality of weighted unordered groups of string tokens; and
determining, by the one or more processors, a meaning vector for an identifier of each row of the relational database by applying, by a machine learning environment, one or more embedding techniques to the plurality of weighted unordered groups of string tokens;
receiving, by the one or more processors, a query for the relational database; and
using, by the one or more processors, the meaning vector for the identifier of each row of the relational database to respond to the query.

16. A system, comprising:
a processor; and
logic integrated with the processor, executable by the processor, or integrated with and executable by the processor, the logic being configured to:
identify a relational database;
determine columns of interest within the relational database;
create an unordered group of string tokens for each row of the relational database, utilizing the determined columns of interest;
identify pre-assigned weights for one or more columns within the relational database;
add the pre-assigned weights for the one or more columns to one or more string tokens within each unordered group of string tokens to create a plurality of weighted unordered groups of string tokens; and
determine a meaning vector for an identifier of each row of the relational database by applying, by a machine learning environment, one or more embedding techniques to the plurality of weighted unordered groups of string tokens;
receive a query for the relational database; and
use the meaning vector for the identifier of each row of the relational database to respond to the query.

* * * * *